United States Patent
Candelmo et al.

(10) Patent No.: US 11,751,565 B2
(45) Date of Patent: Sep. 12, 2023

(54) STABLE AGROCHEMICAL COMPOSITION

(71) Applicants: UPL CORPORATION LIMITED, Port Louis (MU); UPL Europe Ltd., Warrington (GB)

(72) Inventors: Jody Candelmo, Orefield, PA (US); Stephen Skorczynski, Yardley, PA (US); Prakash Mahadeo Jadhav, Lawrenceville, NJ (US); Pravin More, Mumbai (IN); Ankush Mali, Mumbai (IN)

(73) Assignees: UPL CORPORATION LIMITED, Port Louis (MU); UPL EUROPE LTD, Warrington (GB)

( * ) Notice: Subject to any disclaimer, the term of this patent is extended or adjusted under 35 U.S.C. 154(b) by 127 days.

(21) Appl. No.: 17/147,613

(22) Filed: Jan. 13, 2021

(65) Prior Publication Data

US 2021/0212319 A1   Jul. 15, 2021

Related U.S. Application Data

(60) Provisional application No. 62/960,226, filed on Jan. 13, 2020.

(51) Int. Cl.
*A01N 37/28* (2006.01)

(52) U.S. Cl.
CPC .......... *A01N 37/28* (2013.01); *A01N 2300/00* (2013.01)

(58) Field of Classification Search
None
See application file for complete search history.

(56) References Cited

FOREIGN PATENT DOCUMENTS

| CN | 103027036 A | * | 4/2013 | |
| CN | 108552181 A | | 9/2018 | |
| EP | 1097638 A1 | * | 5/2001 | ............. A01N 25/04 |
| EP | 2875727 A1 | | 5/2015 | |
| WO | 2016069510 A1 | | 5/2016 | |
| WO | WO-2016169510 A1 | * | 10/2016 | ............. A01N 37/22 |
| WO | 2017021795 A1 | | 2/2017 | |
| WO | WO-2017021795 A1 | * | 2/2017 | ............. A01N 37/22 |

OTHER PUBLICATIONS

"Safety Data Sheet: Flufenacet 400g/l + Diflufenican 200 g/l SC", Feb. 1, 2014, pp. 1-14, XP55793925, Retrieved: Internet.
International Preliminary Report on Patentability for Application No. PCT/GB2021/050071 dated Jul. 19, 2022.
International Search Report for Application No. PCT/GB2021/050071 dated Apr. 21, 2021.
Office Action for Pakistani Application No. 56/2021 daed May 17, 2022.
Written Opinion for International Application No. PCT/GB2021/050071 dated Apr. 21, 2021.

* cited by examiner

*Primary Examiner* — Alton N Pryor
(74) *Attorney, Agent, or Firm* — CANTOR COLBURN LLP

(57) ABSTRACT

The present invention provides a stable agrochemical composition including a dispersed phase comprising an anilide herbicide; a continuous aqueous phase; and at least one anionic surfactant. The present invention also provides a process of preparing stable agrochemical compositions and methods of application thereof.

14 Claims, No Drawings

STABLE AGROCHEMICAL COMPOSITION

CROSS-REFERENCE TO RELATED APPLICATIONS

This application claims priority to U.S. Provisional Application 62/960,226 filed on Jan. 13, 2020, which is incorporated herein by reference in its entirety.

FIELD OF THE DISCLOSURE

The present disclosure relates to a stable agrochemical composition. The present disclosure more particularly relates to a stable agrochemical composition comprising at least one anilide herbicide compound as the active ingredient and to methods of treating plants with said composition.

BACKGROUND

Many solid agrochemicals are formulated in powder form. Handling chemicals in powder form increases potential health issues due to potential inhalation dangers. To minimize this potential danger, solid agrochemicals are often dispersed in water, especially if the solid agrochemical is insoluble or has low solubility in water. This type of stable formulation is commonly referred to as a suspension concentrate (SC) in agricultural applications where the powdered solid is suspended in an aqueous medium. Physical stability is most important in this type of formulation in order to ensure that the small amount of the agrochemical is fully effective. The production of a stable, water-based suspension concentrate formulation is challenging due to potential particle size growth (Ostwald Ripening) and crystal formation. The crystals/particles may not dissolve completely when diluted with water resulting in a clogged spray apparatus and uneven pesticidal applications. Maintaining a stable suspension concentrate with a uniform particle size distribution, no particle size growth and no crystal formation is crucial in preventing settling of particles during storage.

Anilide herbicides are a class of chemical compounds which are acyl derivatives of aniline. Anilide herbicides include chloranocryl, cisanilide, clomeprop, cypromid, diflufenican, flufenacet, flufenican, mefenacet, metamifop, naproanilide, pentanochlor, picolinafen, propanil, sulfentrazone and triafamone.

Propanil is an anilide herbicide with the chemical name N-(3,4-dichlorophenyl)propionamide. It is a highly selective contact herbicide and is mainly used for seedling or broadcast field application, a barnyard grass control, and can also be used for controlling a variety of other gramineous and dicotyledonous weeds, such as *Monochoria vaginalis*, cress, crabgrass, foxtail and the like. Propanil acts by hampering plant photosynthesis, and also by interfering with nucleic acid and protein synthesis. Hence, the physiology of sensitive plant is affected by propanil causing accelerated water loss, gradually withering leaves, and finally death.

Propanil is sparingly soluble in water and is formulated as a dispersion in water. A major drawback of formulating a sparingly water soluble propanil as an aqueous suspension concentrate is Ostwald ripening, which refers to instances in which the larger crystals of the ingredient grow while the smaller crystals dissolve. Physical instability is one manifestation of Ostwald ripening. Further drawbacks to Ostwald ripening include limited utility of the formulation because an acceptable shelf-life may not be obtained. For instance, a two-year shelf-life is typically needed for a successful commercial product in agrochemicals. Also, particles that grow too large may plug spray equipment and may not stay suspended in the spray tank or in the concentrated formulation.

Surfactants are conventionally used to facilitate dispersion of active ingredients into an aqueous composition. The commonly used surfactants in agrochemical formulations are broadly classified as anionic and non-ionic surfactants which are generally used in combination. Conventional surfactants include one or more ethylene oxide/propylene oxide block copolymers, blends of tristyryl phenol (TSP) ethoxylate derivatives in combination with polyvinylpyrrolidone (PVP), PVP/styrene copolymers, and TSP ethoxylates in combination with EO/PO block polymers. The presence of certain surfactants in the aqueous dispersion may modify the solubility of some active ingredients. Therefore, a small portion of the sparingly soluble active may go into the aqueous phase leading to instability of the aqueous dispersion.

Selection of appropriate surfactants plays a critical role in developing stable agrochemical compositions. Hence, there is a need to develop stable agrochemical compositions of anilide herbicide which remain stable throughout the shelf life as well as during application when it is diluted with water.

SUMMARY

An objective of the present disclosure is to provide stable agrochemical compositions of an anilide herbicide.

Another objective of the present disclosure is to provide a stable liquid formulation of an anilide herbicide.

Yet another objective of the present disclosure is to develop stable agrochemical compositions of anilide herbicides in the form of a suspension concentrate.

Yet another objective of the present disclosure is to develop stable agrochemical compositions with uniform particle size.

Still another objective of the present disclosure is to develop a process of preparing stable agrochemical composition of anilide herbicide.

Another objective of the present disclosure is to develop a method of controlling undesirable plants by applying stable agrochemical composition of an anilide herbicide as described herein.

In an aspect, provided stable liquid composition comprising an anilide herbicide as active compound.

In an aspect, a stable agrochemical composition comprises
 a dispersed phase comprising an anilide herbicide;
 a continuous aqueous phase; and
 at least one anionic surfactant In an, a stable agrochemical composition comprises
 a dispersed phase comprising a pre-treated anilide herbicide;
 a continuous aqueous phase; and
 at least one anionic surfactant.

In an aspect, a stable agrochemical composition comprises
 a dispersed phase comprising a pre-treated anilide herbicide;
 a continuous aqueous phase;
 at least one anionic surfactant; and
 optionally further additives and/or auxiliaries.

In another aspect, a stable agrochemical composition comprises
 a dispersed phase comprising a pre-treated anilide herbicide;
 a continuous aqueous phase; and
 at least one anionic surfactant;
 wherein a mean particle size of dispersed phase comprising the anilide herbicide is from about 1 μm to about 100 μm.

Another aspect provides a process for the preparation of a stable agrochemical composition comprising a dispersed phase comprising an anilide herbicide; a continuous aqueous phase; and at least one anionic surfactant, said process comprising admixing the anilide herbicide and an aqueous solution comprising the anionic surfactant(s) to provide a mixture, and milling the resulting mixture to provide the stable agrochemical composition.

In an aspect, a process for the preparation of a stable agrochemical composition comprising a dispersed phase comprising an anilide herbicide; a continuous aqueous phase; and at least one anionic surfactant comprises admixing a pre-treated anilide herbicide and an aqueous solution comprising the anionic surfactant(s) to provide a mixture, and milling the resulting mixture to provide the stable agrochemical composition.

In an, a process for the preparation of a stable agrochemical composition comprising a dispersed phase comprising an anilide herbicide; a continuous aqueous phase; and at least one anionic surfactant comprises
- obtaining a pre-treated anilide herbicide through heat treatment;
- admixing the pre-treated anilide herbicide and the continuous aqueous phase
- comprising the anionic surfactant(s) to provide a mixture, milling the resulting
- mixture; and packaging the resulting mixture to provide the stable agrochemical composition.

In yet another aspect, a method of controlling undesirable vegetation comprises contacting the vegetation or a locus thereof with an herbicidally effective amount of a stable agrochemical composition comprising
- a dispersed phase comprising a pre-treated anilide herbicide;
- a continuous aqueous phase; and
- at least one anionic surfactant
- wherein the contacting prevents the emergence or growth of vegetation.

In accordance with the above objectives, the present disclosure provides the use of a stable agrochemical composition according to the present disclosure as an herbicide.

Additional features and advantages of the present invention will be apparent from the detailed description that follows, which illustrates by way of example, the most preferred features of the present invention which are not to be construed as limiting the scope of the invention described herein.

DETAILED DESCRIPTION

Without wishing to be bound by theory, the inventors have surprisingly found that stable agrochemical compositions comprising an anilide herbicide can be obtained by adding anionic dispersing agents to a pre-treated anilide herbicide. The inventors observed that the composition prepared with anionic surfactants does not develop crystal growth and remained stable during ambient as well as heat stability test conditions. Pre-treatment of an anilide herbicide contributes to morphological changes in the anilide molecule that leads to stability in the presence of anionic surfactants.

Thus, provided herein is a stable agrochemical composition comprising
- a dispersed phase comprising an anilide herbicide;
- a continuous aqueous phase; and
- at least one anionic surfactant.

According to an embodiment, the stable agrochemical composition may be formulated in liquid form, for example as a suspension concentrate (SC), an emulsion concentrate (EW), an oil-based suspension concentrate (OD), and/or a suspoemulsion (SE).

According to a preferred embodiment, the stable agrochemical composition is formulated as a suspension concentrate (SC).

According to an embodiment, a stable agrochemical composition comprises
- a dispersed phase comprising a pre-treated anilide herbicide;
- a continuous aqueous phase;
- at least one anionic surfactant; and
- optionally further additives and/or auxiliaries.

An SC preferably contains components i) and iii) as essential constituents, more preferably components i) to iii) as essential constituents.

As used herein, the term "pre-treated" refers to a heat treatment of the anilide herbicide by way of melting the anilide herbicide followed by re-solidification of the anilide herbicide upon cooling. One aspect of pre-treating is of dynamic heating, wherein the anilide herbicide is placed under circulating hot air having a temperature of 50° C. to 100° C. for a period of time of 10 hours to 4 days, followed by a reduction to room temperature. Another aspect of pre-treating is static heating, wherein the anilide herbicide is kept at a high temperature of 50° C. to 100° C. for a period of time of 10 hours to 4 days, followed by a reduction to room temperature.

As used herein after, the term "melting" refers to heating an anilide herbicide at or above its melting point.

As used herein after, the term "dynamic heating" refers to providing circulating hot air to heat an anilide herbicide.

As used herein after, the term "static heating" refers to providing a constant high temperature of 50° C. to 100° C. to heat anilide herbicide for a period of time of 10 hours to 4 days.

According to an embodiment, a pre-treated anilide herbicide is obtained by melting the anilide herbicide at or above its melting point, allowing the anilide herbicide to re-solidify by cooling; and further grinding the cooled anilide herbicide to desired particle size to provide the pre-treated anilide herbicide.

According to another embodiment, a pre-treated anilide herbicide is obtained by dynamic heating wherein super sacks or containers containing an anilide herbicide are placed in a heat chamber with hot air circulation or continuous rotavapor drying at a temperature of 50° C. to 100° C. for a period of time of 10 hours to 4 days, followed by a reduction to room temperature.

According to another embodiment, a pre-treated anilide herbicide is obtained by static heating wherein a container containing an anilide herbicide is maintained at a temperature of 50° C. to 85° C. for a period of time of 10 hours to 4 days, followed by a reduction to room temperature.

According to another embodiment, pre-treatment of an anilide herbicide involves heat treatment followed by equilibration under ambient conditions before formulating the anilide herbicide as stable agrochemical composition.

Exemplary anilide herbicides include chloranocryl, cisanilide, clomeprop, cypromid, diflufenican, erlujixiancaoan, etobenzanid, fenasulam, flufenacet, flufenican, ipfencarbazone, mefenacet, mefluidide, metamifop, monalide, naproanilide, pentanochlor, picolinafen, propanil, sulfentrazone, and triafamone.

According to an embodiment, a dispersed phase comprises of an anilide herbicide selected from the group consisting of flufenacet, propanil and sulfentrazone, specifically propanil.

In an embodiment, the stable agrochemical composition comprises about 0.1% to about 70% w/w, preferably about 1% to about 60% w/w, and more preferably about 10% to about 50% w/w of the anilide herbicide based on the total weight of the stable agrochemical composition.

The term "% by weight" (percent by weight) as used herein, unless otherwise defined, relates to the relative weight of the respective component based on the total weight of the agrochemical composition.

According to an embodiment, the stable agrochemical composition comprises a continuous aqueous phase.

According to an embodiment, the continuous aqueous phase of the stable agrochemical composition comprises water.

According to an embodiment, the continuous aqueous phase of the stable agrochemical composition comprises water-soluble auxiliary ingredients.

According to an embodiment, the continuous aqueous phase comprises from about 0.1% to about 99% w/w, preferably about 1% to about 80% w/w, more preferably about 10% to about 70% w/w of the continuous aqueous phase based on the total weight of the stable agrochemical composition.

According to an embodiment of the present invention, the stable agrochemical composition comprises an anionic surfactant. Exemplary anionic surfactants include aromatic sulfonic acids, acrylic polymers, polycarboxylate derivatives, and combinations thereof.

According to an embodiment, the anionic surfactant is an aromatic sulfonic acid, its derivatives, and combinations thereof.

According to an embodiment, the aromatic sulfonic acid surfactant is selected from the group consisting of alkali metal and alkaline earth metal salts of arylsulfonic acids and alkylarylsulphonic acids.

According to an embodiment, the aromatic sulfonic acid is selected from the group consisting of (1) aryl- and C1-C16-alkylarylsulfonates such as naphthylsulfonate, mono-, di- and tri-C1-C16-alkylnaphthylsulfonates such as dibutylnaphtylsulfonate, dodecyldiphenylether sulfonate, mono-, di- and tri-C1-C16-alkylphenylsulfonates such as cumylsulfonate, octylbenzene sulfonate, nonylbenzenesulfonate, dodecylbenzene sulfonate and tridecylbenzene sulfonate; and (2) polymeric anionic surfactants having SO3—groups bound to an aromatic moiety such as a phenyl or a naphthyl ring, e.g. condensates of arylsulfonic acid with formaldehyde and optionally in addition with urea, such as naphthalene sulfonic acid formaldehyde condensates, phenol sulfonic acid formaldehyde condensates, cresol sulfonic acid formaldehyde condensates, ligninsulfonates, and the like; their salts and combinations thereof.

According to an embodiment, the anionic surfactants is anacrylic polymer selected from methyl acrylate, ethyl acrylate, propyl acrylate and butyl acrylate, the corresponding methacrylates, methyl methacrylate, ethyl methacrylate, propyl methacrylate and salts of acrylic acid being anionically substituted, preferably, but not necessarily selected from sulphonates and phosphates.

According to an embodiment, the anionic surfactants are polycarboxylates selected from potassium polycarboxylate, sodium polycarboxylate, alkyl polycarboxylates, benzene polycarboxylates, and the like.

According to preferred embodiment, the anionic surfactant is selected from the group consisting of potassium polycarboxylate, sodium alkyl naphthalene sulfonate blend, sodium diisopropylnaphthalenesulfonate, sodium salt of naphthalene sulfonate condensate, lignin sulfonate salts, and combinations thereof. More particularly, the surfactant is Atlox™ Metasperse™ 550 S, Borresperse NA, Tersperse® 2700, Geropon® SC-213, Morwet® EFW, Supragil® WP, Atlox™ 4913, Morwet® D-425, lignin sulfonate salts or combination thereof.

In another embodiment, the anionic surfactant is selected from the group consisting of sodium lignosulfonate, potassium polycarboxylate, sodium polycarboxylate, styrene acrylic polymer, acrylic copolymers, sodium alkyl naphthalene sulfonate blend, phenol sulfonic acid and naphthalene sulfonic acid blend, sodium diisopropylnaphthalenesulfonate, sodium salt of naphthalene sulfonate condensate, lignin sulfonate salts, and combinations thereof.

In an embodiment, the stable agrochemical composition comprises about 0.1% to about 40% w/w, preferably about 0.1% w/w to about 20% w/w, or more preferably about 0.5% to about 30% w/w anionic surfactant of the total weight of the stable agrochemical composition.

Thus, an embodiment provides a stable agrochemical composition comprising
a dispersed phase comprising an anilide herbicide;
one more additional herbicide;
(ii) a continuous aqueous phase; and
(iii) at least one anionic surfactant;

According to another embodiment, the stable agrochemical composition further comprises one more additional herbicide.

According to an embodiment, the dispersed phase of composition comprises one or more additional herbicides selected from 4-CPA; 4-CPB; 4-CPP; 2,4-D; 2,4-D choline salt, 2,4-D esters and amines, 2,4-DB; 3,4-DA; 3,4-DB; 2,4-DEB; 2,4-DEP; 3,4-DP; 2,3,6-TBA; 2,4,5-T; 2,4,5-TB; acetochlor, acifluorfen, aclonifen, acrolein, alachlor, allidochlor, alloxydim, allyl alcohol, alorac, ametridione, ametryn, amibuzin, amicarbazone, amidosulfuron, aminocyclopyrachlor, aminopyralid, amiprofos-methyl, amitrole, ammonium sulfamate, anilofos, anisuron, asulam, ataton, atrazine, azafenidin, azimsulfuron, aziprotryne, barban, BCPC, beflubutamid, benazolin, bencarbazone, benfluralin, benfuresate, bensulfuron-methyl, bensulide, benthiocarb, bentazon-sodium, benzadox, benzfendizone, benzipram, benzobicyclon, benzofenap, benzofluor, benzoylprop, benzthiazuron, bialaphos, bicyclopyrone, bifenox, bilanafos, bispyribac-sodium, borax, bromacil, bromobonil, bromobutide, bromofenoxim, bromoxynil, brompyrazon, butachlor, butafenacil, butamifos, butenachlor, buthidazole, buthiuron, butralin, butroxydim, buturon, butylate, cacodylic acid, cafenstrole, calcium chlorate, calcium cyanamide, cambendichlor, carbasulam, carbetamide, carboxazole chlorprocarb, carfentrazone-ethyl, CDEA, CEPC, chlomethoxyfen, chloramben, chloranocryl, chlorazifop, chlorazine, chlorbromuron, chlorbufam, chloreturon, chlorfenac, chlorfenprop, chlorflurazole, chlorflurenol, chloridazon, chlorimuron, chlornitrofen, chloropon, chlorotoluron, chloroxuron, chloroxynil, chlorpropham, chlorsulfuron, chlorthal, chlorthiamid, cinidon-ethyl, cinmethylin, cinosulfuron, cisanilide, clethodim, cliodinate, clodinafop-propargyl, clofop, clomazone, cloneprop, cloprop, cloproxydim, clopyralid, CMA, copper sulfate, CPMF, CPPC, credazine, cresol, cumyluron, cyanatryn, cyanazine, cycloate, cyclopyrimorate, cyclosulfamuron, cycloxydim, cycluron, cyhalofop-butyl, cyperquat, cyprazine, cyprazole, cypromid, daimuron, dalapon, dazomet, delachlor, desmedipham, desmetryn, di-allate, dicamba, dichlobenil, dichloralurea, dichlormate, dichlorprop, dichlorprop-P, diclofop-methyl, diethamquat, diethatyl, difenopenten, difenoxuron, difenzoquat, diflufenican, diflufenzopyr, dimefuron, dimepiperate, dimethachlor, dimethametryn, dimethenamid, dimethenamid-P, dimexano, dimidazon, dinitramine, dinofenate, dinoprop, dinosam, dinoseb, dinoterb, diphenamid, dipropetryn, diquat, disul, dithiopyr, diuron, DMPA, DNOC, DSMA, EBEP, eglinazine, endothal, epronaz, EPTC, erbon, esprocarb, ethalfluralin, ethbenzamide, ethametsulfuron, ethidimuron, ethiolate, ethobenzamid, etobenzamid, ethofumesate, ethoxyfen, ethoxysulfuron, etinofen, etnipromid, etobenzanid, EXD, fenasulam, fenoprop, fenoxaprop, fenoxaprop-P-ethyl, fenoxaprop-P-ethyl+isoxadifen-ethyl, fenoxasulfone, fenteracol, fenthiaprop, fentrazamide, fenuron, ferrous sulfate, flamprop, flamprop-M, flazasulfuron, fluazifop, fluazifop-P-butyl, fluazolate, flucarbazone, flucetosulfuron, fluchloralin, flufenacet, flufenican, flufenpyr-ethyl, flumezin, flumiclorac-pentyl, flumioxazin, flumipropyn, fluometuron, fluorodifen, fluoroglycofen, fluoromidine, fluoronitrofen, fluothiuron, flupoxam, flupropacil, flupropanate, flupyrsulfuron, fluridone, fluorochloridone, fluoroxypyr, fluoroxypyr-meptyl, flurtamone, fluthiacet, fomesafen, foramsulfuron, fosamine, fumiclorac, furyloxyfen, glufosinate, glufosinate-ammonium, glufosinate-P-ammonium, glyphosate salts and esters, halauxifen, halauxifen-methyl, halosafen, halosulfuron-methyl, haloxydine, haloxyfop-methyl, haloxyfop-P-methyl, hexachloroacetone, hexaflurate, hexazinone, imazamethabenz, imazamox, imazapic, imazapyr, imazaquin, imazosulfuron, cloransulam-methyl, indanofan, indaziflam, iodobonil, iodomethane, iodosulfuron, iodosulfuron-ethyl-sodium, iofensulfuron, ioxynil, ipazine, ipfencarbazone, iprymidam, isocarbamid, isocil, isomethiozin, isonoruron, isopolinate, isopropalin, isoproturon, isouron, isoxaben, isoxachlortole, isoxaflutole, isoxapyrifop, karbutilate, ketospiradox, lactofen, lenacil, linuron, MAA, MAMA, MCPA esters and amines, MCPA-thioethyl, MCPB, mecoprop, mecoprop-P, medinoterb, mefenacet, mefluidide, mesoprazine, mesosulfuron, mesotrione, metam, metamifop, metamitron, metazachlor, metazosulfuron, metflurazon, methabenzthiazuron, methalpropalin, methazole, methiobencarb, methiozolin, methiuron, methometon, methoprotryne, methyl bromide, methyl isothiocyanate, methyldymron, metobenzuron, metobromuron, metolachlor, metoxuron, metribuzin, metsulfuron, metsulfuron-methyl, molinate, monalide, monisouron, monochloroacetic acid, monolinuron, monuron, morfamquat, MSMA, naproanilide, napropamide, naptalam, neburon, nicosulfuron, nipyraclofen, nitralin, nitrofen, nitrofluorfen, norflurazon, noruron, OCH, orbencarb, ortho-dichlorobenzene, orthosulfamuron, oryzalin, oxadiargyl, oxadiazon, oxapyrazon, oxasulfuron, oxaziclomefone, oxyfluorfen, paraflufen-ethyl, parafluoron, paraquat, pebulate, pelargonic acid, pendimethalin, pentachlorophenol, pentanochlor, pentoxazone, perfluidone, pethoxamid, phenisopham, phenmedipham, phenmedipham-ethyl, phenobenzuron, phenylmercury acetate, picloram, picolinafen, pinoxaden, piperophos, potassium arsenite, potassium azide, potassium cyanate, pretilachlor, primisulfuron-methyl, procyazine, prodiamine, profluazol, profluralin, profoxydim, proglinazine, prohexadione-calcium, prometon, prometryn, pronamide, propachlor, propanil, propaquizafop, propazine, propham, propisochlor, propoxycarbazone, propyrisulfuron, propyzamide, prosulfalin, prosulfocarb, prosulfuron, proxan, prynachlor, pydanon, pyraclonil, pyraflufen-ethyl, pyrasulfotole, pyrazogyl, pyrazolynate, pyrazosulfuron-ethyl, pyrazoxyfen, pyribenzoxim, pyributicarb, pyriclor, pyridafol, pyridate, pyriftalid, pyriminobac, pyrimisulfan, pyrithiobac-sodium, pyroxasulfone, quinclorac, quinmerac, quinoclamine, quinonamid, quizalofop, quizalofop-P-ethyl, rhodethanil, rimsulfuron, saflufenacil, S-metolachlor, sebuthylazine, secbumeton, sethoxydim, siduron, simazine, simeton, simetryn, SMA, sodium arsenite, sodium azide, sodium chlorate, sulcotrione, sulfallate, sulfometuron, sulfosate, sulfosulfuron, sulfuric acid, sulglycapin, swep, SYN-523, TCA, tebutam, tebuthiuron, tefuryltrione, tembotrione, tepraloxydim, terbacil, terbucarb, terbuchlor, terbumeton, terbuthylazine, terbutryn, tetrafluoron, thenylchlor, thiazafluoron, thiazopyr, thidiazimin, thidiazuron, thiencarbazone-methyl, thifensulfuron, thifensulfurn-methyl, thiobencarb, tiocarbazil, tioclorim, topramezone, tralkoxydim, triafamone, tri-allate, triasulfuron, triaziflam, tribenuron, tribenuron-methyl, tricamba, triclopyr choline salt, triclopyr esters and salts, tridiphane, trietazine, trifloxysulfuron, trifluralin, triflusulfuron, trifop, trifopsime, trihydroxytriazine, trimeturon, tripropindan, tritac tritosulfuron, vernolate, xylachlor, salts, esters, optically active isomers, and mixtures thereof.

According to an embodiment, the one more additional herbicide in the stable agrochemical composition is quinclorac.

According to an embodiment, the one more additional herbicide in the stable agrochemical composition is pyrazosulfuron-ethyl.

According to an embodiment, the stable agrochemical composition comprises of one more additional herbicide selected from the group consisting of quinolinecarboxylic acid herbicides, pyrazole herbicides, thiocarbamate herbicides, pyridine herbicides, chloroacetanilide herbicides and their salts, derivatives, isomers and mixtures thereof.

According to an embodiment, the stable agrochemical composition comprises of one more additional herbicides selected from the group consisting of quinclorac, quinmerac, azimsulfuron, cyclopyranil, halosulfuron, metazachlor, metazosulfuron, pyraclonil, pyrazosulfuron, pyroxasulfone, butylate, cycloate, i-allate, EPTC, esprocarb, ethiolate, isopolinate, methiobencarb, molinate, orbencarb, pebulate, prosulfocarb, pyributicarb, sulfallate, thiobencarb, tiocarbazil, tri-allate, vernolate, aminopyralid, cliodinate, clopyralid, diflufenican, dithiopyr, florpyrauxifen, flufenican, fluroxypyr, halauxifen, haloxydine, picloram, picolinafen, pyriclor, pyroxsulam, thiazopyr, triclopyr, xyloxadine, acetochlor, alachlor, amidochlor, butachlor, butenachlor, elachlor, diethatyl, dimethachlor, ethachlor, ethaprochlor, metazachlor, metolachlor, S-metolachlor, pretilachlor, propachlor, propisochlor, prynachlor, terbuchlor, thenylchlor, xylachlor, their salts, derivatives, isomers and mixtures thereof.

In an embodiment, the additional herbicide is selected from the group consisting of quinclorac, pyrazosulfuron-ethyl, thiobencarb, triclopyr, and butachlor.

In an embodiment, the stable agrochemical composition comprises about 0.1% to about 60% w/w, preferably about 1% to about 50% w/w, more preferably about 10% to about 40% w/w of the additional herbicide based on the total weight of the stable agrochemical composition.

According to an embodiment, the relative amount of the anilide herbicide and the additional herbicide is from 50:1 to 1:50 and in a ratio from 20:1 to 1:20 (weight ratio) in the stable agrochemical composition.

In an embodiment, the stable agrochemical composition further comprises one or more of antifreeze agents, wetting agents, fillers, surfactants, anticaking agents, pH-regulating agents, preservatives, biocides, antifoaming agents, colorants, safeners, other formulation aids, and combinations thereof.

Exemplary antifreeze agents include liquid polyols, for example ethylene glycol, propylene glycol, and glycerol.

Wetting agents include, but are not limited to, polyarylalkoxylated phosphate esters and their potassium salts (e.g., Soprophor®® FLK, Stepfac® TSP PE-K. Other suitable wetting agents include sodium dioctylsulfosuccinates (e.g., Geropon®® SDS, Aerosol® OT) and ethoxylated alcohols (e.g., Trideth®-6; Rhodasurf®® BC 610; Tersperse® 4894).

Optionally, about 0.1 wt % to about 5.0 wt % of antifoaming or defoamers are employed to stop any unwanted foam generated while manufacturing a highly concentrated liquid biocide dispersion composition. Exemplary antifoaming agents include silicone-based compounds, alcohols, glycol ethers, mineral spirits, acetylene diols, polysiloxanes, organosiloxanes, siloxane glycols, reaction products of silicon dioxide and organosiloxane polymer, polydimethylsiloxanes or polyalkylene glycols alone or in combination. Exemplary defoamers include SAG-10; SAG-1000AP; SAG-1529; SAG-1538; SAG-1571; SAG-1572; SAG-1575; SAG-2001; SAG-220; SAG-290; SAG-30; SAG-30E; SAG-330; SAG-47; SAG-5440; SAG-7133 and SAG-770.

Examples of thickening agents based on anionic heteropolysaccharides from the xanthan gum group are inter alia the Rhodopo® 1 23, Rhodopol® R G, Rhodopol® R 50 MD, Rhodicare® T, Kelzan®, Kelzan® S and Satiaxane® CX91.

Preservatives/biocide include benzisothiazolinone (Proxel™ GXL), phenols, 2-bromo-2-nitropropane-1,3-diol (Bioban™ BP 30), 5-chloro-2-methyl-4-isothiazolin-3-one & 2 methyl-4-isothiazolin-3 one (Kathon™ CG/ICP), Glutaraldehyde (Ucarcide™ 50), Chloromethylisothiazolinone (CMIT)/Methylisothiazolinone (MIT) (Isocil® R Ultra 1.5), 2.2-dibromo-3-nitrilopropioamide (Reputain™ 20), Natamycin & Nisin, Bronopol/CMIT/MIT (Mergal® R 721K3).

Exemplary colorants (for example in red, blue and green) are, preferably, pigments, which are sparingly soluble in water, and dyes, which are water-soluble. Examples include inorganic coloring agents (for example iron oxide, titanium oxide, and iron hexacyanoferrate) and organic coloring agents (for example alizarin, azo and phthalocyanin coloring agents).

Exemplary safeners include benoxacor, BPCMS, cloquintocet, cyometrinil, cyprosulfamide, dichlormid, dicyclonon, dietholate, fenchlorazole, fenclorim, flurazole, fluxofenim, furilazole, isoxadifen, jiecaowan, jiecaoxi, mefenpyr, mephenate, metcamifen, naphthalic anhydride, and oxabetrinil.

In an embodiment, the stable agrochemical composition comprises from about 0.1% to about 70% w/w of the anilide herbicide, from about 0.1% to about 40% of the anionic surfactant, and from about 0.1% to about 99% of the continuous aqueous phase based on the total weight of the stable agrochemical composition.

In an embodiment, the stable agrochemical composition comprises from about 10% to about 50% w/w of the anilide herbicide, from about 1% to about 20% of the anionic surfactant, and from about 10% to about 70% of the continuous aqueous phase based on the total weight of the stable agrochemical composition.

In an embodiment, a stable agrochemical composition comprises from about 10% to about 50% w/w of the propanil herbicide, from about 1% to about 20% of the anionic surfactant, and from about 10% to about 70% of the continuous aqueous phase based on the total weight of the stable agrochemical composition.

In an embodiment, a stable agrochemical composition comprises from about 0.1% to about 70% w/w of the anilide herbicide, from about 0.1% to about 60% w/w of the additional herbicide, from about 0.1% to about 40% of the anionic surfactant, and from about 0.1% to about 99% of the continuous aqueous phase based on the total weight of the stable agrochemical composition.

In an embodiment, a stable agrochemical composition comprises from about 10% to about 50% w/w of the anilide herbicide, from about 1% to about 20% w/w of the additional herbicide, from about 1% to about 20% of the anionic surfactant, and from about 10% to about 70% of the continuous aqueous phase based on the total weight of the stable agrochemical composition.

In an embodiment, a stable agrochemical composition comprises from about 10% to about 50% w/w of propanil herbicide, from about 1% to about 20% w/w of quinclorac herbicide, from about 1% to about 20% of the anionic surfactant, and from about 10% to about 70% of the continuous aqueous phase based on the total weight of the stable agrochemical composition.

Preferably the present compositions are formulated as aqueous suspension concentrates (SC).

In an embodiment, there is provided a stable aqueous suspension concentrate (SC) comprising from about 0.1% to about 70% w/w of the anilide herbicide, from about 0.1% to about 40% of the anionic surfactant, and from about 0.1% to about 99% of the continuous aqueous phase based on the total weight of the stable agrochemical composition.

The present composition/formulations are stable and passed 14 days Accelerated Heat Stability (AHS) testing, 7 day Freeze-thaw testing, and remained as flowable suspensions as no crystals were observed to be retained on wet sieve.

In an embodiment, the aqueous suspension concentrates and herbicidal compositions are stable and have effective herbicidal activity against a broad spectrum of weeds.

In another embodiment, provided is the use of aqueous suspension concentrates and herbicidal compositions according to the disclosure n for the control of undesirable vegetation.

In accordance with the above objectives, provides is the use of an aqueous suspension concentrate comprising from about 10% to about 40% w/w propanil, from about 0.5% to about 5% anionic surfactant based on the total weight of the stable agrochemical composition, and optionally further additives and auxiliaries, for treatment or control of weeds.

According to the present invention, the properties and advantages mentioned herein are useful in effective weed control so as to have agricultural crops free of undesired competing plants and thus to protect the plant and/or to increase the yield of crop quantitatively and qualitatively.

The aqueous suspension concentrates (SC) according to the invention show reduced tendency to cause phytotoxic damage.

The aqueous suspension concentrates (SC) according to the invention result in long-term storage-stable and provide technically perfect formulations.

The SC formulations remained stable when tested at ambient conditions, i.e. room temperature and pressure. The present compositions also passed 14 days Accelerated Heat Stability (AHS) testing and remained a flowable suspension in off-white appearance. Further, the compositions remained as off-white flowable suspensions with negligible particle growth in a 7 Freeze-Thaw (FT) cycle.

Thus, advantageously, it was found that active content remained almost constant without any significant deterioration or loss. Surprisingly, the present composition demonstrated no crystallization of active compound at ambient temperature and passed 14 days Accelerated Heat Stability (AHS) testing, 7-day Freeze-thaw testing and remained a flowable suspension.

According to an embodiment, a process for the preparation of a stable agrochemical composition comprising a dispersed phase comprising an anilide herbicide; a continuous aqueous phase; and at least one anionic surfactant comprises admixing the anilide herbicide and an aqueous solution comprising the anionic surfactant(s) to provide a mixture, milling the resulting mixture; and packaging the resulting stable agrochemical composition.

According to an embodiment, a process for the preparation of a stable agrochemical composition comprising a dispersed phase comprising an anilide herbicide; a continuous aqueous phase; and at least one anionic surfactant comprises admixing the anilide herbicide and an aqueous solution comprising the anionic surfactant(s), antifreeze agent(s), wetting agent(s) and antifoaming agent(s), milling the resulting mixture to reduce a particle size of suspended particles; admixing thickening agents, antifreeze agents, preservatives and optionally other auxiliary ingredients; and packaging the resulting stable agrochemical composition.

According to another embodiment, a process for the preparation of a stable agrochemical composition comprising a dispersed phase comprising propanil; a continuous aqueous phase; and at least one anionic surfactant comprises admixing, propanil and an aqueous solution comprising anionic surfactant(s), antifreeze agent(s), wetting agent(s) and antifoaming agent(s), milling the resulting mixture to reduce a particle size of suspended particles; admixing thickening agents; antifreeze agents, preservatives and optionally other auxiliary ingredients; and packaging the resulting agrochemical composition.

According to an embodiment, a process for the preparation of a stable agrochemical composition comprising a dispersed phase comprising a pre-treated anilide herbicide; a continuous aqueous phase; and at least one anionic surfactant comprises admixing the pre-treated anilide herbicide and an aqueous continuous phase comprising the anionic surfactant(s) to provide a mixture, milling the resulting mixture; and packaging the resulting stable agrochemical composition.

According to an embodiment, a process for the preparation of a stable agrochemical composition utilizes a pre-treated anilide herbicide, wherein pre-treatment involves heating the anilide herbicide by melting the anilide herbicide followed by re-solidification upon cooling, by treating the anilide herbicide through circulating hot air or by keeping the aniline herbicide under high temperature for a sufficient time prior to its incorporation in the stable aqueous composition.

According to an embodiment, a pre-treated anilide herbicide is obtained by melting the anilide herbicide at or above its melting point and then allowing the anilide herbicide to resolidify by cooling; and further grinding the cooled anilide herbicide to desired particle size to obtain the pre-treated anilide herbicide.

According to another embodiment, a pre-treated anilide herbicide is obtained by dynamic heating wherein super sacks or containers containing anilide herbicide are placed in heat chamber with hot air circulation or continuous rotavapor drying for a sufficient period of time and then reducing to room temperature According to another embodiment, pre-treated anilide herbicide is obtained by static heating wherein a container containing the anilide herbicide is maintained between 50° C. to 85° C. for 10 hours to 4 days and then reducing to room temperature.

According to another embodiment, pre-treated anilide herbicide is equilibrated to ambient conditions before formulating it as a stable agrochemical composition.

According to an embodiment, a process for the preparation of a stable agrochemical composition comprising a dispersed phase comprising a pre-treated anilide herbicide; a continuous aqueous phase; and at least one anionic surfactant comprises admixing, on a weight to weight basis, 10% to 40% of the pre-treated anilide herbicide, the continuous aqueous phase comprising the anionic surfactant(s), antifreeze agent(s), wetting agent(s) and antifoaming agent(s), milling the resulting mixture to reduce a particle size of suspended particles; admixing thickening agents, antifreeze agents, preservatives and optionally other auxiliary ingredients; and packaging the resulting stable agrochemical composition.

According to another embodiment, a process for the preparation of a stable agrochemical composition comprising a dispersed phase comprising a pre-treated anilide herbicide; a continuous aqueous phase; and at least one anionic surfactant comprises admixing the pre-treated anilide herbicide, an additional herbicide and the continuous aqueous phase comprising the anionic surfactant(s), antifreeze agent(s), wetting agent(s) and antifoaming agent(s), milling the resulting mixture to reduce a particle size of suspended particles; admixing thickening agents; antifreeze agents, preservatives and optionally other auxiliary ingredients; and packaging the resulting stable agrochemical composition.

According to another embodiment, a process for the preparation of a stable agrochemical composition comprising a dispersed phase comprising pre-treated propanil; a continuous aqueous phase; and at least one anionic surfactant comprises admixing, on a weight to volume basis, the pre-treated propanil herbicide, an aqueous solution comprising the anionic surfactant(s), antifreeze agent(s), wetting agent(s) and antifoaming agent(s), milling the resulting mixture to reduce a particle size of suspended particles; admixing thickening agents; antifreeze agents, preservatives and optionally other auxiliary ingredients; and packaging the resulting stable agrochemical composition.

According to another embodiment, in the process of preparation of a stable agrochemical composition, the sequence of mixing active ingredients, anionic surfactants and optionally other ingredients is not fixed and may vary according to the preference of the formulator.

According to an embodiment, a stable agrochemical composition comprises a dispersed phase comprising a pre-treated anilide herbicide; a continuous aqueous phase; and at least one anionic surfactant; wherein a mean particle size of the dispersed phase comprising the anilide herbicide is from about 1 micron to about 100 microns.

According to preferred embodiment, a stable agrochemical composition comprises a dispersed phase comprising a pre-treated anilide herbicide; a continuous aqueous phase; and at least one anionic surfactant; wherein a mean particle size of the dispersed phase comprising the anilide herbicide is from about 5 microns to about 50 microns.

According to preferred embodiment of the present invention, a stable agrochemical composition comprises:
  a dispersed phase comprising pre-treated anilide herbicide;
  a continuous aqueous phase; and
  at least one anionic surfactant;
  wherein mean particle size of dispersed phase comprising anilide herbicide is from about 5 micron to about 50 micron.

In an embodiment, the dispersed phase of the stable agrochemical composition has a particle size distribution D10 of less than about 2.5 microns, preferably less than about 1.5 microns.

In an embodiment, the dispersed phase of the stable agrochemical composition has a particle size distribution D50 of less than about 10.0 microns, preferably less than about 7.0 microns, more preferably less than about 5 microns.

In an embodiment, the dispersed phase of the stable agrochemical composition has a particle size distribution D90 of less than or equal to about 30 microns, preferably less than or equal to about 15 microns, more preferably less than or equal to about 5 microns.

In an embodiment, the dispersed phase of the stable agrochemical composition has a particle size distribution D100 of less than or equal to about 150 microns, preferably less than or equal to about 100 microns, more preferably less than or equal to about 50 microns.

According to an embodiment, the stable agrochemical composition prepared in above steps is subjected to particle size reduction by applying shear to the mixture of active ingredients, anionic surfactants and other auxiliary agents. Exemplary devices for this purpose are devices that offer milling operation, e.g., high shear mixers such as ROS HSM, Ultra-Turrax apparatus, and dissolvers, static mixers, e.g., systems having mixing nozzles, bead mills, vibratory mills, agitator bead mills, colloid mills, cone mills, circulating mills (agitator ball mills with pin grinding system), disk mills, annular chamber mills, double cone mills, sprocket dispersers or homogenizers and other homogenizers.

According to an embodiment, the milling operation is performed in low temperature conditions with a temperature of ≤40° C., preferably ≤20° C.

According to an embodiment, the milling operation may be performed with cryogenic or refrigerated cooling.

In an embodiment, a stable agrochemical composition comprises from about 10% to about 40% w/w propanil, from about 0.5% to about of an 5% anionic surfactant, and from about 0.1% to 99% of a continuous aqueous phase based on the total weight of the stable agrochemical composition, wherein said stable agrochemical composition is formulated as suspension concentrate.

In an embodiment, a suspension concentrate comprises from about 10% to about 40% w/w propanil, from about 0.5% to about 5% of an anionic surfactant, and from about 0.1% to 99% of a continuous aqueous phase based on the total weight of the stable agrochemical composition, wherein the composition optionally further comprises additives and auxiliaries.

In an embodiment, an aqueous suspension concentrate comprises from about 10% to about 40% w/w propanil, from about 0.5% to about 5% of an anionic surfactant based on the total weight of the stable agrochemical composition, wherein the composition optionally further comprises additives and auxiliaries.

In an embodiment, a stable agrochemical composition comprises from about 10% to about 40% w/w propanil, from about 0.5% to about 5% of sodium lignosulphonate, and from about 0.1% to 99% water based on the total weight of the stable agrochemical composition, wherein said stable agrochemical composition is formulated as suspension concentrate.

In an embodiment, a stable agrochemical composition comprises from about 10% to about 40% w/w propanil, from about 10% to about 40% quinclorac, from about 0.5% to about 5% sodium lignosulphonate, and from about 0.1% to 99% water based on the total weight of the stable agrochemical composition, wherein said stable agrochemical composition is formulated as suspension concentrate.

According to an embodiment, the stable agrochemical composition is designed to be diluted with water (or a water-based liquid) to form the corresponding end-use agrochemical formulations, typically spray formulations.

According to an embodiment, the stable agrochemical composition has a pH ranging from pH 5-7.

According to an embodiment, the stable agrochemical composition has a variation in pH of no more than 20% when stored at 54° C. between 24 hours and 28 days.

According to an embodiment, the stable agrochemical composition provides a formulation which allows the active compounds to be taken up by the plants.

According to an embodiment, the stable agrochemical composition is used as the source of active agrochemical ingredients and will typically be diluted to form end-use formulations, typically spray formulations. The dilution may be with water at from 1 to 10,000, particularly 10 to 1,000, times the total weight of the stable agrochemical composition to form the spray formulation. Said stable agrochemical composition may to provide an agrochemical active concentration of about 0.5 wt. % to about 1 wt. %. In the diluted composition, the agrochemical active concentration may be in the range of about 0.001 wt. % to about 1 wt. % of the total formulation as sprayed.

Spray formulations include all the components which are desired for application to the plants or their environment. Spray formulations can be produced by simple dilution of stable agrochemical composition containing agrochemically active ingredients, or by mixing of the individual agrochemically active ingredients, or a combination of diluting a stable agrochemical composition and adding further individual agrochemically active ingredients or mixtures of agrochemically active ingredients. Typically, such end use mixing is carried out in the tank from which the formulation is sprayed, or alternatively in a holding tank for filling the spray tank. Such mixing and mixtures are typically termed tank mixing and tank mixtures.

In an embodiment, a method of controlling undesirable vegetation comprises contacting the vegetation or a locus thereof or applying to the soil to prevent the emergence or growth of vegetation, a herbicidally effective amount of stable agrochemical composition comprising:

a dispersed phase comprising a pre-treated anilide herbicide;

a continuous aqueous phase; and at least one anionic surfactant.

According to an embodiment, a method of controlling undesirable vegetation comprises contacting the vegetation or the locus thereof or applying to the soil or water to prevent the emergence or growth of vegetation, a herbicidally effective amount of a stable agrochemical composition comprising (a) pre-treated propanil, (b) water and (c) an anionic surfactant.

According to an embodiment, a method of controlling undesirable vegetation comprising contacting the vegetation or the locus thereof or applying to the soil or water to prevent the emergence or growth of vegetation a herbicidally effective amount of a stable agrochemical composition comprising (a) pre-treated propanil, (b) water and (c) sodium lignosulfonate.

According to an embodiment, a method of controlling undesirable vegetation comprises contacting the vegetation or the locus thereof or applying to the soil or water to prevent the emergence or growth of vegetation a herbicidally effective amount of a stable agrochemical composition comprising (a) pre-treated propanil, (b) quinclorac, (c) water and (d) sodium lignosulfonate.

In an embodiment, the stable agrochemical composition is used as an herbicide.

In an embodiment of, the stable agrochemical composition comprising propanil, anionic surfactants and optionally other auxiliary ingredients is used as an herbicide.

According to an embodiment, the various components of the stable agrochemical composition can be used individually or already partially or completely mixed with one another to prepare the composition according to the invention. It is also possible for them to be packaged and used further as combination composition such as a kit of parts.

In one embodiment, the kits may include one or more, including all, components that may be used to prepare a stable agrochemical composition. For example, kits may include active ingredients and/or anionic surfactants. One or more of the components may already be combined together or pre-formulated. In those embodiments where more than two components are provided in a kit, the components may already be combined together and as such are packaged in a single container such as a vial, bottle, can, pouch, bag or canister.

In other embodiments, two or more components of a kit may be packaged separately, i.e., not pre-formulated. As such, kits may include one or more separate containers such as vials, cans, bottles, pouches, bags or canisters, each container containing a separate component for stable agrochemical composition.

In both forms, a component of the kit may be applied separately from or together with the further components or as a component of a combination composition according to the invention for preparing the stable agrochemical composition according to the invention.

In a preferred embodiment, the stable agrochemical composition comprises (a) anilide herbicide, (b) a continuous aqueous phase, (c) one or more anionic surfactants, and (d) optionally, an additional herbicide in the form of a kit with single pack or multi pack.

The composition described above is herbicidally efficacious and is stable. It has been found that the anionic surfactants of the stable agrochemical composition of the present invention provide excellent stability over time and at various temperatures, and even when the stable agrochemical composition undergoes shear forces for example on mixing. Also, the stable agrochemical composition obtained by the processes described herein have superior suspensibility, excellent dispersibility, very low or no sedimentation and little particle degradation.

All the features described herein may be combined with any of the above aspects, in any combination.

In order that the present invention may be more readily understood, reference will now be made, by way of example, to the following examples.

However, the scope of the present invention is not limited by the examples in any manner. It will be appreciated by any person skilled in this art that the present invention includes aforesaid examples and further can be modified and altered within the scope of the present invention. It will be understood that all tests and physical properties listed have been determined at atmospheric pressure and room temperature (i.e. 25° C.), unless otherwise stated herein, or unless otherwise stated in the referenced test methods and procedures.

EXAMPLES

Example 1: Preparation of Propanil 480 G/L Sc

| # | Ingredients | % w/w |
|---|---|---|
| 1 | Propanil | 41.25 |
| 2 | Sodium lignosulfonate | 03.00 |
| 3 | 1,2,3-Propanetriol | 06.00 |
| 4 | Water | QS |
| Total | | 100.00 |

Process Using Pre-Treated Technical (Pre-Treatment by Melting):

41.25 g propanil was melted in a water bath at 95° C. (203° F.) to 100° C. (212° F.), cooled to ambient temperature and ground to desired particle size to provide pre-treated propanil. Separately, 3.0 g sodium lignosulfonate, 6.0 g 1,2,3-propanetriol and water were admixed and homogenized for 30 minutes using a conventional homogenizer to provide a mixture. The temperature during homogenization was kept at sub-ambient condition, preferably ≤20 C(68° F.). To the mixture, pre-treated propanil was added with continued homogenization and temperature control to provide homogenized mill base. The homogenized mill base was subjected to wet grinding with appropriate media to achieve desired particle size.

Example 2: Preparation of Propanil 480 G/L Sc

| # | Ingredients | % w/w |
|---|---|---|
| 1 | Propanil 41.2 @ 98 | 42.07 |
| 2 | Sodium lignosulfonate | 03.00 |
| 3 | 1,2,3-Propanetriol | 06.00 |
| 4 | Water | QS |
| Total | | 100.00 |

Process Using Pre-Treated Treated Technical (Pre-Treatment by Dynamic Heating)

A super sack of propanil was placed in a heat chamber with hot air circulation. The temperature of the heat chamber was kept between 50° C.-70° C. (122° F.-158° F.) for at least 72 hours. 42.07 g of propanil was removed from the chamber and allowed to equilibrate to ambient temperature prior to use in the composition. Separately, 3.0 g sodium lignosulfonate, 6.0 g 1,2,3-propanetriol and water were admixed and homogenized for 30 minutes using a conventional homogenizer to obtain mixture. The temperature during homogenization was kept at sub-ambient condition, preferably ≤20° C.(68° F.). To the mixture, the pre-treated propanil was added with continued homogenization and temperature control to provide a homogenized mill base. The homogenized mill base was subjected to wet grinding with appropriate media to achieve the desired particle size.

Example 3: Preparation of Propanil 480 G/L Sc

| Ingredients | % w/w |
|---|---|
| Propanil | 42.09 |
| Naphthalene sulphonic acid and phenol sulphonic acid (Tamol ® DN) | 1 |

-continued

| Ingredients | % w/w |
|---|---|
| Sodium lignosulphonate | 2.00 |
| Glycerin | 6.00 |
| SAG-1572 | 0.5 |
| Proxel® GXL | 0.05 |
| Xanthan gum (2% gel) | 10 |
| Water | 38.36 |
| Total | 100.00 |

Propanil, naphthalene sulphonic acid and phenol sulphonic acid, sodium lignosulphonate, glycerin, SAG-1572, Proxel® GXL and xanthan gum (2% gel) were mixed in water in a given ratio shown above and a suspension concentrate was prepared as per the process of Example 1.

Example 4: Preparation of Propanil 480 G/L Sc

| Ingredients | % w/w |
|---|---|
| Propanil | 42.09 |
| Styrene acrylic polymer | 1 |
| Sodium lignosulphonate | 2.00 |
| Glycerin | 6.00 |
| SAG-1572 | 0.5 |
| Proxel® GXL | 0.05 |
| Xanthan gum (2% gel) | 10 |
| Water | 38.36 |
| Total | 100.00 |

Propanil, modified styrene acrylic polymer, sodium lignosulphonate, glycerine, SAG-1572, Proxel® GXL and Xanthan gum (2% gel) were mixed in water in a given ratio shown above and suspension concentrate was prepared as per the process of Example 1.

Example 5: Preparation of Propanil 480 G/L Sc

| Ingredients | % w/w |
|---|---|
| Propanil | 42.09 |
| Potassium polycarboxylate | 1 |
| Sodium lignosulphonate | 2.00 |
| Glycerin | 6.00 |
| SAG-1572 | 0.5 |
| Proxel® GXL | 0.05 |
| Xanthan gum (2% gel) | 10 |
| Water | 38.36 |
| Total | 100.00 |

Propanil, potassium polycarboxylate, sodium lignosulphonate, glycerin, SAG-1572, Proxel® GXL and xanthan gum (2% gel) were mixed in water in a given ratio shown above and suspension concentrate was prepared as per the process of Example 1.

Example 6: Preparation of Propanil 480 G/L Sc

| Ingredients | % w/w |
|---|---|
| Propanil | 42.09 |
| Acrylic copolymer solution | 1 |

-continued

| Ingredients | % w/w |
|---|---|
| Sodium lignosulphonate | 2.00 |
| Glycerin | 6.00 |
| SAG-1572 | 0.5 |
| PROXEL® GXL | 0.05 |
| Xanthan gum (2% gel) | 10 |
| Water | 38.36 |
| Total | 100.00 |

Propanil, acrylic copolymer solution, sodium lignosulphonate, glycerin, SAG-1572, Proxel® GXL and xanthan gum (2% gel) were mixed in water in a given ratio shown above and suspension concentrate was prepared as per the process of Example 1.

Example 7: Preparation of Propanil 480 G/L+Quinclorac 45 G/L Sc

| # | Ingredients | Quantity w/w |
|---|---|---|
| 1 | Propanil | 42.07 |
| 2 | Quinclorac | 4.21 |
| 3 | Sodium lignosulfonate | 3.00 |
| 4 | 1,2,3-Propanetriol | 6.00 |
| 5 | Water | 34.12 |
| | Total | 100.00 |

Propanil, quinclorac, sodium lignosulfonate and 1,2,3-Propanetriol were mixed in water in a given ratio shown above and suspension concentrate was prepared as per the process of Example 1.

Example 8: Preparation of Propanil 240 G/L+Quinclorac 45 G/L Sc

| # | Ingredients | Quantity (w/w) |
|---|---|---|
| 1 | Propanil | 22.62 |
| 2 | Quinclorac | 4.40 |
| 3 | Sodium lignosulfonate | 3.00 |
| 4 | 1,2,3-Propanetriol | 6.00 |
| 5 | Water | 34.12 |
| | Total | 100.00 |

Propanil, quinclorac, sodium lignosulfonate and 1,2,3-propanetriol were mixed in water in a given ratio shown above and suspension concentrate was prepared as per the process of Example 1.

Example 9: Preparation of Propanil 480G/L SC (Comparative Example)

| Ingredients | Quantity % w/w |
|---|---|
| Propanil | 42.16 |
| Alkylphenyl polyglycol ether sulfate | 2.50 |
| Propylene glycol block polymer | 1.51 |
| Sodium alkylnaphthalenesulfonate | 2.51 |
| Ethylene Glycol | 6.01 |

-continued

| Ingredients | Quantity % w/w |
|---|---|
| Silica | 0.51 |
| Water | QS |
| Total | 100.00 |

2.51 g sodium alkylnaphthalenesulfonate, 2.50 g alkylphenyl polyglycol ether sulfate, 1.51 g propylene glycol block polymer, 6.01 g ethylene glycol, 0.51 g silica, and water were admixed and homogenized for 30 minutes using a conventional homogenizer to provide admixture. The temperature during homogenization was kept at sub-ambient condition, preferably ≤20° C.(68° F.). To the mixture, propanil was added with continued homogenization and temperature control to provide a homogenized mill base. The propanil added had not undergone pre-treatment. The homogenized mill base was subjected to wet grinding with appropriate media to achieve the desired particle size.

Example 10: Preparation of Propanil 480G/L SC (Comparative Example

| Ingredients | % w/w |
|---|---|
| Propanil | 42.09 |
| Tristyrylphenol surfactant | 1 |
| Sodium lignosulphonate | 2.00 |
| Glycerin | 6.00 |
| SAG-1572 | 0.5 |
| Proxel ® GXL | 0.05 |
| Xanthan gum (2% gel) | 10 |
| Water | 38.36 |
| Total | 100.00 |

Propanil, tristrylphenol surfactant, sodium lignosulfonate, glycerin, SAG-1572, Proxel® GXl, and xanthan gum were admixed in water in a given ratio shown above and suspension concentrate was prepared as per the process of Example 9.

Example 11: Preparation of Propanil 480 G/L SC (Comparative Example

| Ingredients | % w/w |
|---|---|
| Propanil | 42.09 |
| Tristyrylphenol phosphate surfactant | 3 |
| Sodium lignosulphonate | 0.00 |
| Glycerin | 6.00 |
| SAG-1572 | 0.5 |
| Proxel ® GXL | 0.05 |
| Xanthan gum (2% gel) | 10 |
| Water | 38.36 |
| Total | 100.00 |

Propanil, tristrylphenol phosphate surfactant, sodium lignosulfonate, glycerin, SAG-1572, Proxel® GXL, and xanthan gum were admixed in water in a given ratio shown above and suspension concentrate was prepared as per the process of Example 9.

Example 12: Preparation of Propanil 480 G/L SC (Comparative Example

| Ingredients | % w/w |
|---|---|
| Propanil | 42.09 |
| Tristyrylphenol phosphate surfactant | 3.00 |
| Sodium lignosulphonate | 0.50 |
| Glycerin | 6.00 |
| SAG-1572 | 0.5 |
| Proxel ® GXL | 0.05 |
| Xanthan gum (2% gel) | 10 |
| Water | 38.36 |
| Total | 100.00 |

Stability Study:

Stability features associated with compositions prepared according to the present invention were studied. The compositions described in Example-1 to Example-6 were prepared to evaluate physicochemical parameters. It was found that the compositions of Example-1 to Example-6 prepared according to present process using only anionic surfactants remained stable when tested at ambient conditions i.e. room temperature and pressure. The compositions also passed 14 days Accelerated Heat Stability (AHS) test and remained as a flowable suspension with an off-white appearance.

Further, the compositions remained as an off-white flowable suspension with negligible particle growth in a 7-day Freeze-Thaw (FT) cycle. The amount of active content has also been evaluated at all three stages (ambient, AHS and FT). It was found that the active content remained almost constant without any significant deterioration or loss. The composition also passed wet sieve testing as no crystals were observed to be retained on a wet sieve. The particle size of the composition was analyzed and found to be nearly constant suggesting little/negligible particle size growth or crystal formation. (Table-1)

TABLE 1

| | Exampe 1 | | |
|---|---|---|---|
| Parameters | Ambient | 14 Days AHS | 7 Days FT |
| Appearance | Off white flowable suspension | Off white flowable suspension | Off white flowable suspension |
| Active Content % w/w | 42.00 | 42.05 | 42.08 |
| Wet sieve on 200 BSS % w/w | Nil | Nil | Nil |
| Particle Size D-50 | 4.82 | 11.2 | 6.26 |
| D-90 | 11.7 | 23.8 | 14.1 |
| D — Mean | 5.87 | 11.2 | 9.2 |

TABLE 1-continued

Example-2

| Parameters Appearance | Ambient Off white flowable suspension | 14 Days Off white Viscous thick suspension | 7DFT Off white Viscous Flowable suspension |
|---|---|---|---|
| Active Content % w/w | 42.24 | 42.14 | 42.21 |
| wet sieve on 200 BSS % w/w | Nil | Nil | Nil |
| Particle Size D-50 | 2.17 | 15.4 | 7.92 |
| D-90 | 12.3 | 36.1 | 16.2 |
| D — Mean | 2.87 | 11.2 | 9.2 |

Example-3

| Parameters Appearance | Ambient Off white flowable suspension | 14 Days Off white flowable suspension | 7 DFT Off white flowable suspension |
|---|---|---|---|
| Active Content % w/w | 41.77 | 41.61 | 41.72 |
| wet sieve on 200 BSS % w/w | Nil | Nil | nil |
| Particle Size D-50 | 2.12 | 10.32 | 2.22 |
| D-90 | 7.44 | 17.25 | 6.90 |
| D — Mean | 1.60 | 5.2 | 1.68 |

Example-4

| Parameters Appearance | Ambient Off white flowable suspension | 14 Days Off white flowable suspension | 7 DFT Off white flowable suspension |
|---|---|---|---|
| Active Content % w/w | 41.56 | 41.12 | 41.60 |
| wet sieve on 200 BSS % w/w | Nil | Nil | Nil |
| Particle Size D-50 | 2.40 | 9.8 | 2.52 |
| D-90 | 8.19 | 24.8 | 7.31 |
| D — Mean | 5.21 | 16.1 | 5.55 |

Example-5

| Parameters Appearance | Ambient Off white flowable suspension | 14 Days Off white flowable suspension | 7 DFT Off white flowable suspension |
|---|---|---|---|
| Active Content % w/w | 41.88 | 41.52 | 41.91 |
| wet sieve on 200 BSS % w/w | Nil | Nil | Nil |
| Particle Size D-50 | 1.72 | 6.82 | 1.88 |
| D-90 | 5.64 | 16.2 | 5.75 |
| D — Mean | 2.66 | 8.23 | 2.82 |

Example-6

| Parameters Appearance | Ambient Off white flowable suspension | 14 Days Off white flowable suspension | 7 DFT Off white flowable suspension |
|---|---|---|---|
| Active Content % w/w | 41.33 | 41.25 | 41.31 |
| wet sieve on 200 BSS % w/w | Nil | Nil | Nil |
| Particle Size D-50 | 2.09 | 8.36 | 2.22 |
| D-90 | 6.16 | 17.34 | 6.31 |
| D — Mean | 3.21 | 9.34 | 3.42 |

Comparative Study:

A comparative study was conducted to evaluate the impact of the presence of non-ionic surfactants on the stability of the compositions and also the impact of the incorporation of propanil that did not undergo heat treatment. Several compositions were prepared as Example-9 to Example-12 by combining various non-ionic surfactants and anionic surfactants. The compositions of Example-9, Example-10 and Example-12 were subjected to ambient, AHS and FT testing conditions. It was observed that the compositions of Example-9, Example-10 and Example-12 remained stable in ambient conditions but became thick in a 14 day AHS study due to crystal growth. In the FT study, the composition of Example-9 became thick making it more viscous. (Table-2).

TABLE 2

| Example-9 | | | |
|---|---|---|---|
| Parameters | Ambient | 14 Days | 7DFT |
| Appearance | Off white flowable suspension | Off white Viscous thick suspension | Off white Viscous Flowable suspension |
| Active Content % w/w | 42.00 | 42.05 | 42.08 |
| wet sieve on 200 BSS % w/w | Nil | Nil | 3 |
| Particle Size D-50 | 5.26 | 13.8 | 30.52 |
| D-90 | 13.9 | 27.9 | 236.1 |
| D — Mean | 6.69 | 14.81 | 85.08 |

| Example-10 | | | |
|---|---|---|---|
| Parameters | Ambient | 14 Days | 7DFT |
| Appearance | Off white flowable suspension | Off white thick suspension not flowable | Off white flowable suspension |
| Active Content % w/w | 41.73 | 41.61 | 41.71 |
| wet sieve on 200 BSS % w/w | Nil | 0.1 | 0.85 |
| Particle Size D-50 | 3.62 | 20.5 | 30.21 |
| D-90 | 10.3 | 50.9 | 90.8 |
| D — mean | 4.92 | 26.3 | 44.3 |

| Example-11 |
|---|
| Thickened in processing and hence discarded and so couldn't considered for ambient, AHS and FT studies. |

| Example-12 | | | |
|---|---|---|---|
| Parameters | Ambient | 14 Days | 7DFT |
| Appearance | Off white flowable suspension | Light brown thick suspension not flowable | Off white flowable suspension |
| Active Content % w/w | 41.37 | 41.21 | 41.40 |
| wet sieve on 200 BSS % w/w | Nil | 0.15 | 1.1 |
| Particle Size D-50 | 6.67 | 27.1 | 68.90 |
| D-90 | 14.8 | 75.9 | 168.9 |
| D — Mean | 7.66 | 35.5 | 88.5 |

Therefore, inventors of the present invention found that the aqueous compositions developed according to the present invention using anionic surfactants alone resulted in a stable composition. The anionic surfactants provided good performance over time, low or no sedimentation, and little particle size degradation. The Suspension Concentrate composition prepared according to the present invention also passed wet sieve tests indicating product stability. The heat treatment of the propanil prior to its incorporation in the suspension concentrate also imparted stability to the compositions developed according to the present invention. It is to be understood that the invention is not to be limited to the details of the above embodiments, which are described by way of example only.

The invention claimed is:

1. A stable aqueous agrochemical composition comprising
   i) a dispersed phase comprising a pre-treated anilide herbicide consisting of propanil, wherein pretreated comprises a heat treatment to prevent crystal growth in the composition;
   ii.) a continuous aqueous phase; and
   iii.) at least one anionic surfactant.

2. The composition as claimed in claim 1, wherein said composition comprises about 0.1% w/w to about 70% w/w of the pre-treated anilide herbicide based on the total weight of the composition.

3. The composition as claimed in claim 1, wherein the anionic surfactant is selected from the group consisting of aromatic sulfonic acid, acrylic polymers, polycarboxylate compounds, and combinations thereof.

4. The composition as claimed in claim 1, wherein the anionic surfactant is selected from the group consisting of sodium lignosulfonate, potassium polycarboxylate, sodium polycarboxylate, styrene acrylic polymer, acrylic copolymers, sodium alkyl naphthalene sulfonate blend, phenol sulfonic acid and naphthalene sulfonic acid blend, sodium diisopropylnaphthalenesulfonate, sodium salt of naphthalene sulfonate condensate, lignin sulfonate salts, and combinations thereof.

5. The composition as claimed in claim 1, wherein said composition comprises about 0.1% w/w to about 20% w/w of the anionic surfactant based on the total weight of the composition.

6. The composition as claimed in claim 1, wherein said composition is in the form of suspension concentrate (SC).

7. The composition as claimed in claim 1, wherein the stable agrochemical composition further comprises an additional herbicide.

8. The composition as claimed in claim 7, wherein said additional herbicide is selected from the group consisting of quinolinecarboxylic acid herbicides, pyrazole herbicides, thiocarbamate herbicides, pyridine herbicides, chloroacetanilide herbicides, their salts, isomers, and mixtures thereof.

9. A stable aqueous agrochemical composition comprising
   i) a dispersed phase comprising a pre-treated anilide herbicide, wherein pretreated comprises a heat treatment to prevent crystal growth in the composition;
   ii.) a continuous aqueous phase; and
   iii.) at least one anionic surfactant, wherein a mean particle size of a dispersed phase is about 1 µm to about 100 µm.

10. A stable aqueous agrochemical composition comprising,
   i) a dispersed phase comprising a pre-treated anilide herbicide, wherein pretreated comprises a heat treatment to prevent crystal growth in the composition;
   ii.) a continuous aqueous phase; and
   iii.) at least one anionic surfactant,
   wherein the stable agrochemical composition further comprises an additional herbicide,
   wherein said additional herbicide is selected from the group consisting of quinolinecarboxylic acid herbicides, pyrazole herbicides, thiocarbamate herbicides, pyridine herbicides, chloroacetanilide herbicides, their salts, isomers, and mixtures thereof, and
   wherein said additional herbicide is selected from the group consisting of quinclorac, pyrazosulfuron-ethyl, thiobencarb, triclopyr, and butachlor.

11. A stable aqueous agrochemical composition comprising about 0.1% to about 70% w/w of pre-treated propanil, about 0.1% to about 20% of an anionic surfactant, and about 0.1% to 99% of a continuous aqueous phase based on the total weight of the composition, as suspension concentrate, wherein pretreated comprises a heat treatment to prevent crystal growth in the composition.

12. A process for the preparation of a stable aqueous agrochemical composition comprising a dispersed phase comprising a pre-treated anilide herbicide, wherein pretreated comprises a heat treatment to prevent crystal growth in the composition; a continuous aqueous phase; and at least one anionic surfactant; wherein said process comprises
   a) obtaining a pre-treated anilide herbicide through heat treatment;
   b) admixing the pre-treated anilide herbicide and the continuous aqueous phase comprising the at least one anionic surfactant to provide a mixture and milling the resulting mixture to provide the stable agrochemical composition.

13. The process as claimed in claim 12, wherein the pre-treated anilide herbicide is obtained by melting, dynamic heating or static heating.

14. A method of controlling undesirable vegetation, comprising contacting undesired vegetation or a locus thereof with an herbicidally effective amount of a stable aqueous agrochemical composition comprising:
   i.) a dispersed phase comprising a pre-treated anilide herbicide, wherein pretreated comprises a heat treatment to prevent crystal growth in the composition;
   ii.) a continuous aqueous phase; and
   iii.) at least one anionic surfactant
   wherein contacting prevents the emergence or growth of the undesired vegetation.

* * * * *